United States Patent [19]
Kaelin

[11] 3,984,321
[45] Oct. 5, 1976

[54] SEWAGE TREATMENT PLANT

[76] Inventor: Joseph Richard Kaelin, Villa Seeburg, CH-6374 Buochs, Switzerland

[22] Filed: Nov. 25, 1974

[21] Appl. No.: 527,174

[30] Foreign Application Priority Data
Nov. 23, 1973  Switzerland................ 016513/73

[52] U.S. Cl.............................. 210/182; 210/195 S; 210/202; 210/205; 210/220
[51] Int. Cl.²............................................ C02C 1/10
[58] Field of Search............................ 210/4–8, 210/14, 15, 63, 195, 197, 201, 202, 220, 256, 257, 260, 261, 182, 205

[56] References Cited
UNITED STATES PATENTS

| | | | |
|---|---|---|---|
| 2,027,370 | 1/1936 | Currie | 210/256 UX |
| 2,574,685 | 11/1951 | Baxter et al. | 210/195 |
| 2,777,815 | 1/1957 | Forrest | 210/260 X |
| 2,901,114 | 8/1959 | Smith et al. | 210/202 X |
| 3,166,501 | 1/1965 | Spohr | 210/195 |
| 3,312,346 | 4/1967 | Walker | 210/256 X |
| 3,415,379 | 12/1968 | Thayer | 210/256 X |
| 3,547,813 | 12/1970 | Robinson et al. | 210/195 X |
| 3,809,242 | 5/1974 | Bosje | 210/202 X |

*Primary Examiner*—Charles N. Hart
*Assistant Examiner*—Robert H. Spitzer
*Attorney, Agent, or Firm*—Eric P. Schellin

[57] ABSTRACT

An improved, compact biological sewage treatment plant comprised of a series of serially connected treatment tanks of arcuate shape when viewed in top plan view, joined operatively together essentially in an end-to-end circumferential ring-like manner, forming a central space adapted to house additional sludge dehydrating and auxiliary treatment apparatus and equipment for control and maintainance of the plant. A particular advantageous feature includes providing additional concentrically disposed series of said treatment tanks all operatively connected to provide for selectively expandable capacity as needed, with a minimum of adverse environmental impact on the surrounding populace.

3 Claims, 3 Drawing Figures

SEWAGE TREATMENT PLANT

This invention relates to a sewage treatment plant with preliminary sedimentation, aeration and final sedimentation tanks.

Sewage treatment plants are already known which have a generally circular ground plan area including a central tank. Additional buildings outside the sedimentation treatment area are thus required for the sediment mud processing as well as the various plant control and operation equipment, thus involving considerably higher building costs as well as requiring considerably more space.

An object of the present invention is the provision of a more compactly efficient annular ring form sewage treatment plant which can be constructed at minimal cost and requires minimal space.

The sewage treatment plant according to the invention comprises preliminary sedimentation, aeration and final sedimentation tanks located in sequence and immediately adjacent to each other essentially in a circle or ring, in such a manner that each of two circumferentially adjacent tanks are separated from each other by a common partition, whereby the space within the ring serves to accommodate a biological sedimentation mud processing plant as well as the premises and equipment for controlling the installation.

It is preferable for a ring-segment-shaped sludge densifier tank to be located circumferentially between and essentially immediately adjacent to the spaced-apart ends of the preliminary sedimentation and to the final sedimentation tanks.

In order to arrive at the lowest possible flow velocities, it is preferable for the final sedimentation tank to have an inlet channel running along the inwardly directed longitudinal or inner peripheral side and connected with the discharge of the aeration tank, and with a discharge channel running along the radially outwardly directed peripheral longitudinal side.

Furthermore, it is preferable for a return sludge channel to run circumferentially and radially along the inwardly radially directed circumferential side of the final sedimentation tank and of the aeration tank, one end of the said channel being connected with the inlet of the aeration tank by way of a radially disposed return sludge regulating arrangement, and a suction extractor moving longitudinally along the final sedimentation tank to transfer sludge drawn from the bottom of the final sedimentation tank to the channel intended for the return sludge.

The channel intended for the return sludge may conveniently be connected to the sludge densifier tank by means of a surplus sludge regulating control arrangement.

In order further to improve the effect of the aeration tank the sedimentation sludge treatment arrangement may conveniently be equipped with at least one reactor receiving the sedimentation sludge for biological treatment, at least one blower for introducing the gas or gas mixture assisting the biological transformation process into the reactor and at least one extraction or exhaust fan for removing a gas mixture from the inside of the reactor, the extraction fan being connected with at least one heat exchanger located inside the aeration tank.

The invention will now be described by way of example, with reference to the drawings, wherein.

Figure 1:
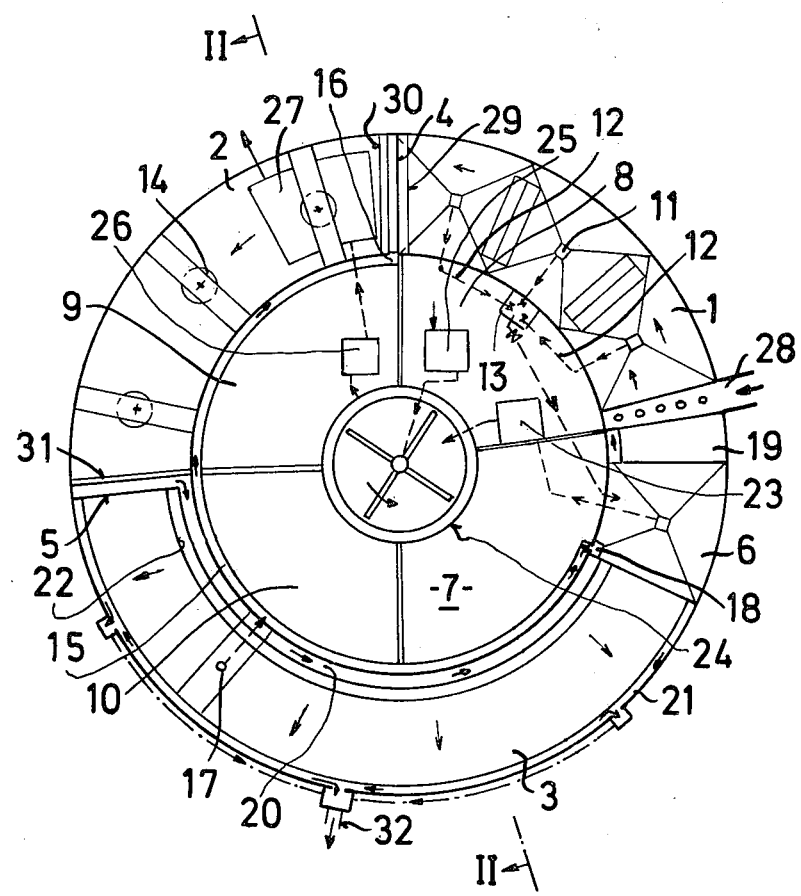
FIG. 1 is a ground plan of one annular form embodiment of the sewage treatment plant of the invention.
Figure 2:
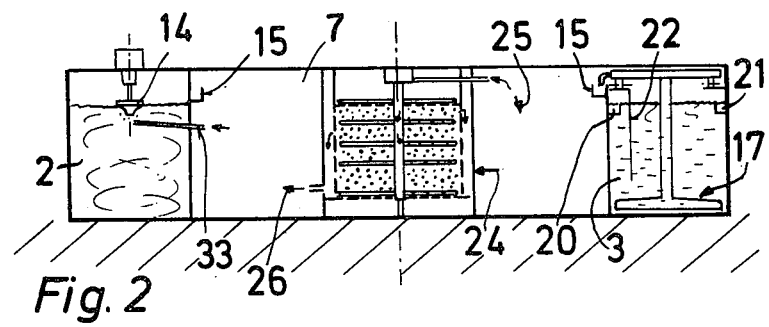
FIG. 2 is a section along the line II—II in FIG. 1.

Referring to FIGS. 1 and 2 of the drawings, the sewage treatment plant therein shown includes a preliminary sedimentation tank 1, an aeration tank 2 and a final sedimentation tank 3, in the form of circumferentially adjacent segments of a circle or ring in such a manner that each of two neighbouring tanks disposed circumferentially are separated by a common partition 4,5. A sludge densifier tank 6 in the form of a segment of a ring is located circumferentially between the preliminary sedimentation tank 1 and the final sedimentation tank 3, immediately against the latter.

The space 7 within the ring formed collectively by the tanks 1, 2, 3 and 6 serves to accommodate a biological sedimentation sludge processing arrangement, and the generally quadrant shaped spaces 8, 9 and 10 comprising space 7 contain equipment for controlling the sedimentation and treatment plant.

The base of the preliminary sedimentation tank 1 has sludge collectors 11 connected by means of discharge ducts 12 with a sludge pump pit 13 for the purpose of sludge removal.

The aeration tank 2 is sealed at the top against gas escape, and has surface ventilation stirrers 14 for introducing pure oxygen-enriched air in to the effluent within the tank 2. The feeds bringing the pure oxygen-enriched air lead within the suction area of the surface ventilation stirrers 14.

A return sludge channel 15 extends along the radially inwardly directed longitudinal or inner peripheral side of the final sedimentation tank 3 as well as of the aeration tank 2, for the return of activated sludge, one end of the said channel being connected with the inlet side of the aeration tank 2 by way of a return-sludge regulating control arrangement 16. Furthermore, a moving suction extractor 17 is located to move arcuately longitudinally to the final sedimentation tank 3, and to transport sludge drawn from the base of the final sedimentation tank 3 into the channel 15 intended for return sludge. The return sludge channel 15 is connected by means of a second surplus sludge regulating control arrangement 18 with the sludge densifier tank 6.

The final sedimentation tank 3 has an inlet channel 20 running along the radially inwardly disposed peripheral side and connected with the aeration tank 2 discharge side, and a discharge channel 21 running along the radially outward peripheral or longitudinal side, so that very low flow velocities occur as a result of the transverse flow through the final sedimentation tank 3. An immersed partition 22 is also located on the radially outward side of the inlet channel 20, the latter of which directs the activated sludge-effluent mixture reaching the final sedimentation tank 3 to ensure a downwards flow of the sludge effluent.

An inlet 19 is provided for access to the space between the arcuately disposed preliminary sedimentation tank 1 and the sludge densifier tank 6.

For the purpose of further biological treatment of the sedimentation sludge, the sludge densifier 6 is connected by means of a sludge dehydrating unit 23 to a treatment compartment designed as a reactor 24 for the purpose of receiving the sedimentation sludge intended for biological treatment. The treatment compartment 24 is connected with a pressure blower 25 for introducing pure oxygen-enriched air into the inside of the compartment 24, and with an exhaust fan 26 for drawing off the gas mixture from the inside of the treatment compartment 24, so that the biology of the sedimentation sludge in the treatment compartment may be suitably supplied with oxygen. Material temperatures of approx. 80° C occur within the treatment compartment 24 as a result of the accompanying biological transformation process.

In order further to assist the biological process occurring within the aeration tank 2, it is now possible to direct the heated gas mixture drawn from the treatment compartment 24 by means of the exhaust fan 26 through the heat exchanger 27 located in the aeration tank 2, so that the effluent within the aeration tank is heated.

The effluent to be treated arrives during the course of treatment by way of a screen and sand-trap through a feed duct 28 into the preliminary sedimentation tank 1. After suitable dwell time in the preliminary sedimentation tank 1, the mechanically cleaned effluent is discharged by way of the discharge rim of the suspended immersion partition 29. The discharge rim is formed by the upper edge of the separating partition 4.

The sludge deposited by gravity on the bottom of the preliminary sedimentation tank 1 is intermittently drawn off from the sludge collectors 11 by way of the ducts 12.

Discharge into the aeration tanks 2 is effected along the whole length of the separating partition 4 arranged in conjunction with a further immersion partition 30.

After a suitably long treatment period, the activated sludge/effluent mixture leaves the aeration tank below the deeply downwardly extending immersion partition 31 and by way of the outlet channel 32 formed by the partition 5 and connected with the inlet channel 20.

The activated sludge/effluent mixture flowing into the final sedimentation tank 3 after passing the immersion partition 22 is steadied within the final tank 3 in such a manner that the activated sludge settles on the bottom of the tank, whereupon the biologically purified effluent is drawn off from the sewage treatment plant by way of the discharge channel 21 and the discharge duct 32 connected to it.

Figure 3:
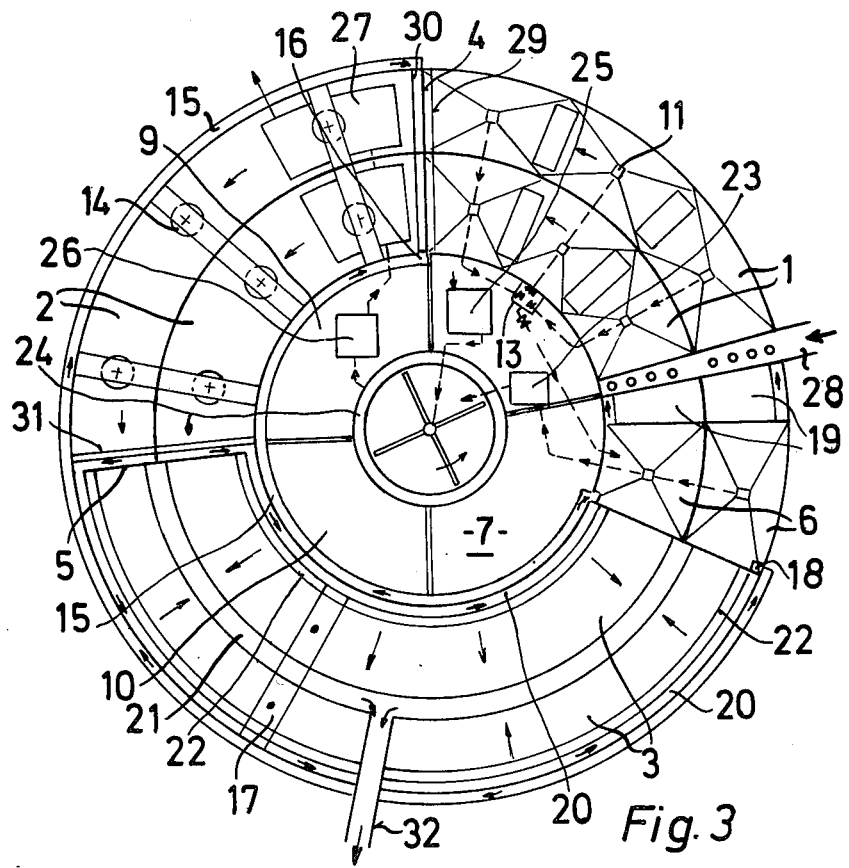
FIG. 3 is a plan view of a second embodiment of the sewage treatment plant of the invention showing an additional concentric ring assembly of the sewage treatment facilities shown in FIG. 1.

With regard to the FIG. 3 embodiment, the plant according to the invention can be expanded at all times easily by constructing another ring of installations to the outer periphery of the existing plant. For the newly constructed ring, only the ring-shaped floor part, the inner installations and the outer cylindrical need to be constructed since the existing outer peripheral wall of the original plant will be used as the inner wall. The concentric arrangement of the service spaces and the common central location of the installation treating the surplus sludge in final form, is extremely compact and still remains easily expandable and can be built efficiently with minimum disturbance to the environment even in densely populated areas. This is because even noises of low frequency are inherently isolated from the environment by the closed ring full of tanks producing a protecting noise barrier so that no further noise protection is needed.

What we claim is:

1. A biological sewage treatment plant for purifying fluid sewage effluent including settled sludge comprising in combination a series of arcuately shaped tanks including a preliminary sedimentation tank, an aeration tank, and a final sedimentation tank, collectively disposed in assembled relationship as to form essentially continuous segments of an annular ring formation when viewed in top plan view, said ring segments collectively defining a central open space therein for disposition of additional plant control and maintenance apparatus while retaining substantial open space;

said tanks having means serially connecting them for operative serial fluid communication commencing with said preliminary sedimentation tank continuing through said final sedimentation tank;

means for charging sewage effluent into said preliminary sedimentation tank;

said respective sedimentation tanks each having means for mechanically effecting sedimentation and cleansing of the fluid effluent and for discharging it from the respective tanks, and said aerating tank having means for aerating the fluid effluent passing therethrough and for discharging it therefrom;

means for receiving and transferring surplus sludge from said preliminary sedimentation tank sequentially into sludge densifier tank means and then into sludge dehydrating and treatment means constituting at least a part of said additional plant control and maintenance apparatus as disposed within said central open space;

the means for discharging the cleansed fluid effluent from the final sedimentation tank including first channel means to draw off, and outlet means through which to discharge purified effluent, wherein said final sedimentation tank is provided near an upper part thereof with an inlet channel formed therein along a radially inward peripheral side thereof, which channel is fed with cleansed effluent discharged from said aeration tank;

said final sedimentation tank also having formed therein an effluent discharge channel along a radially outward peripheral side thereof and generally coplanar with said inlet channel, said discharge channel constituting at least a part of said first channel means for drawing off the purified effluent;

means radially interconnecting said inlet and discharge channels;

return sludge channel means extending along an upper radially inward periphery of both the final sedimentation tank and said aeration tank for return of surplus activated sludge to said aeration tank by means of sludge return control means near a juncture of said aeration tank with said preliminary sedimentation tank; and movable suction extractor means movable longitudinally within said final sedimentation tank for extracting settled sludge from the bottom of said tank and depositing it into said return sludge channel for return to said aeration tank.

2. A biological sewage treatment plant for purifying fluid sewage effluent including settled sludge comprising in combination a series of arcuately shaped tanks including a preliminary sedimentation tank, an aeration tank, and a final sedimentation tank, collectively disposed in assembled relationship as to form essentially continuous segments of an annular ring formation when viewed in top plan view, said ring segments collectively defining a central open space therein for disposition of additional plant control and maintenance apparatus while retaining substantial open space;

at least one exhaust fan for effecting exhausting of a gas mixture from within said reactor treatment compartment;

at least one heat exchanger located within said aeration tank; and duct means for operatively conveying said exhausted gas mixture from said reactor treatment compartment in heat exchange relation with said heat exchanger and into said aeration tank;

said tanks having means serially connecting them for operative serial fluid communication commencing with said preliminary sedimentation tank continuing through said final sedimentation tank;

means for charging sewage effluent into said preliminary sedimentation tank;

said respective sedimentation tanks each having means for mechanically effecting sedimentation and cleansing of the fluid effluent and for discharging it from the respective tanks, and said aerating tank having means for aerating the fluid effluent passing therethrough and for discharging it therefrom;

means for receiving and transferring surplus sludge from said preliminary sedimentation tank sequentially into sludge densifier tank means and then into sludge dehydrating and treatment means constituting at least a part of said additional plant control and maintenance apparatus as disposed within said central open space;

said additional plant control and maintenance apparatus also including at least one compression blower for introducing a gas or gas mixture into said reactor treatment compartment for assisting biological transformation therein of said sludge;

said sludge dehydrating and treatment means including a reactor treatment compartment to receive biologically treated sediment sludge; and the means for discharging the cleansed fluid effluent from the final sedimentation tank including channel means to draw off, and outlet means through which to discharge purified effluent.

3. The plant of claim 1, wherein said return sludge channel means includes a sludge channel having one end terminating adjacent said sludge densifier in conjunction with said channel end and disposed operatively to selectively control return of said surplus sludge to said sludge densifier tank.

* * * * *